United States Patent [19]

Picek

[11] Patent Number: 5,173,190
[45] Date of Patent: Dec. 22, 1992

[54] RECONDITIONING AND REUSE OF CHILLED WATER FOR POULTRY AND FOOD PROCESSING

[76] Inventor: Charles R. Picek, 10322 Malcolm Cir., Cockeysville, Md. 21030

[21] Appl. No.: 864,056

[22] Filed: Apr. 6, 1992

[51] Int. Cl.$^5$ ............................................. B01D 61/16
[52] U.S. Cl. .................................. 210/651; 210/96.1; 210/259
[58] Field of Search .................... 210/259, 96.1, 651, 210/652, 641, 636, 195.2

[56] References Cited

U.S. PATENT DOCUMENTS 3,917,526  11/1975  Jennings .......................... 210/651 X
4,176,057  11/1979  Wheatley et al. .............. 210/259 X

*Primary Examiner*—Frank Spear

[57] ABSTRACT

This invention is directed to a novel automatic process for effectively, reliably and economically reconditioning for direct reuse various waste waters and particularly those in the nature of poultry and food processing such as the overflow waste water from poultry carcass chill tanks without the use of added chemicals and filter-aid compounds. The invention specifically refers to the removal of gross entrained materials, by screening, floatable solids by static flotation, and, emulsified and haze producing particulates which consist primarily of the proteins, lipids and the bulk of the micro-organisms by a continuous self-cleaning microfilter capable of operationg in a tangential and filter mode with cyclic gaseous liquid backwashing for release and removal of the collected and deleterious contaminants. The integrity of the reconditioned water is continuously monitored by a turbidity sensor, the turbidity indication of which is directly correlated to correspond to associated levels of solids and microorganisms. This invention presents a fully-automated process to provide reconditioned water essentially free of micro-organisms and of acceptable clarity to meet current United States Department of Agriculture regulations for chiller water reuse.

5 Claims, 1 Drawing Sheet

RECONDITIONING AND REUSE OF CHILLED WATER FOR POULTRY AND FOOD PROCESSING

APPLICANT'S FIELD OF SEARCH

17/11.2, 45, 47, 51; 426/418, 524; 210/416.3, 500.23, 542, 919, 923; 422/41, 43

APPLICANT'S REFERENCES CITED

| | | | |
|---|---|---|---|
| 4,028,774 | 06/14/77 | ALLAN | 452/198 |
| 4,627,007 | 12/02/86 | MUSCHANY | 452/198 |
| 4,868,950 | 09/26/89 | HARBEN, JR | 452/198 |
| 3,092,975 | 06/11/63 | ZEBARTH | 452/198 |
| 3,561,040 | 02/19/71 | FLODEN | 17/11.2 |
| 3,631,563 | 01/19/72 | SNOWDEN | 17/51 |
| 3,703,021 | 11/19/72 | SHARP | 17/47 |
| 2,649,615 | 08/25/53 | SHARP | 17/47 |
| 2,942,249 | 06/28/60 | VAN DOLAN | 17/45 |

DISCLOSURE OF INVENTION

This invention relates to a process that incorporates progressive treatment for reconditioning and reuse of chilled water overflow used in poultry and food industries. It is particularly adaptable for automatic and continuous operation without addition and subsequent possible reentry of treatment products and chemicals which would then be considered "Food Additives" if not totally removed prior to reuse.

The process incorporates a simple preliminary screen and flotation unit, followed by an exterior or internal self-cleaning screen. The micro-filter (MF) unit is capable of removing micro-organisms and entrained fat, oil, and grease (FOG) to provide a product that is essentially free of micro-organisms and has an optical clarity of better than 0.5 National Turbidity Unit (NTU).

Typically, this invention covers an effective, reliable and economical process that does provide acceptable clean water for reuse and conforms to current United States Department of Agriculture regulations under 1984 Code of Federal Regulations, Title 9 Part 381-Poultry Products; Chiller Water Reuse, Vol. 49, No. 50, Office of the Federal Register, Washington, D.C. which allows recirculation and reuse as quality water at 110% of what is required when fresh water alone is used on a once through basis.

BACKGROUND OF INVENTION

Generally water and chilled waters are used in poultry and food processing plants for washing, waste fluming, chilling and clean-up. Traditionally, water has been used on a once through basis. However, due to rising utility costs, scarcity of available fresh water, costly more stringent waste water disposal surcharge and pollution regulations, processors must look at recycling process waters, and, especially chiller overflow waters, to achieve reduced operational costs.

Signficant savings can be attained by recycling some or all of various waste water streams and reducing the amount of fresh water usage. Additional savings are also derived through reduction in sewage volume, waste disposal surcharges and total refrigeration load.

Throughout the world there are many guidelines and regulations controlling reuse of waste chill water. Typically, in the United States of America, the USDA has many strict guidelines for water use at many steps especially in poultry processing but does allow some water recycling. The regulation for reuse of chiller water overflow is outlined in the Code of Federal Regulations (USDA, 1984). This regulation specifies that reconditioned chiller water must have at least a 60% reduction in total micro-organisms micro-organisms including coliform bacteria, Escherichia coil, and salmonella and a light transmission at 500 nm of no less than 60% of that of fresh water in order to permit reuse in place of fresh incoming waters.

Laboratory tests have shown that the contaminant in overflow chill water from poultry chill tanks is composed of fats, oils and grease and micro-organisms that work loose from the surfaces of the carcasses as they pass through the cooling tanks. Typically total suspended solids will be in the 600–800 ppm range and, of which approximately 30% (200–250 ppm) will be large floating particles of grease and fat. The major portion of the suspended solids (55% from 20–5 micron) form the opaque haze and are believed to be emulsified oils of entrapped proteins and lipids together with the bulk of the micro-organisms. The remaining 5–10% of the particulates are less than 5 micron and seem to be even more tightly bound and emulsified globules.

These are many ways to recondition such chiller overflow water. The primary requirements are that the treatments be economical, effective, reliable, easily monitored, and avoid use of chemical additives. Very few, if any, have been able to meet all of these requirements successfully.

As one example, dissolved air flotation (DAF) systems combined with disposable filter cartridges were tried to remove the fats, oil and grease (FOG) combined with the micro-organisms. However, the short life of the disposable type filters (even with attempted air blow-back) and the resultant labor intensiveness preempted success.

Ozonation for producing virtually sterile water was also tested in conjunction with DAF systems but the excessive organic loading required ozone usage well above economical limits.

Precoat filter systems using such materials as diatomaceous earth (DE), celite, etc. also proved too labor intensive, too costly, not very reliable, and, not readily adaptable for automatic operation.

Chemical additives and flocculants to improve filtration proved very costly and also require complete removal from the final reconditioned water prior to reuse so as not to be considered as a "Food Additive". This drawback of complete removal also applies to residual ozone and filter aids.

Basically, the most difficult problem in reconditioning overflow chiller water, is removing the emulsified oils that have encapsulated the proteins and lipids together with the bulk of the microorganisms. These emulsified globules are in the 0.1 micron to 1.0 micron range and can best be separated out with a barrier membrane in the porosity range of at least down to 0.2 micron but such membranes in this micro range must be kept clean for optimal filtration rates and cannot tolerate gross F.O.G. loadings. Therefore, it is necessary to remove the large (1/32″ and larger) lumps of fat and grease prior to the microfiltration step.

This invention addresses a process that provides progressive treatment for the removal of the deleterious components in three basic steps and avoids the deficiencies cited in paragraphs above.

BRIEF SUMMARY OF INVENTION

The subject invention covers a process for reconditioning chilled waste waters that embodies a simple series of dedicated equipment comprised of a primary screen separator and a static flotation unit followed by a continuous microfilter operating in a tangential and filter mode with controlled periodic fluid (gaseous and liquid) backwashing through a surface related barrier membrane of sufficient porosity and surface area to maintain dedicated flux flow rates while removing emulsified fats, oils, grease and micro-organisms without addition of chemicals and filter aids and thereby economically and continuously producing quality water for reuse.

Since the contaminant loading is composed of basically two separate types of materials, i.e., (1) large lumps of fats and grease and (2) emulsified globules, the process addresses their removal in two distinct successive steps. The large lumps of fat and grease are removed mechanically by screening and flotation whereas the balance of emulsified oils, micro-organisms, and other not so easily removed entrained materials are removed by a continuous microfilter.

The screens are of the sloping or vibrating variety and the static flotation tank is an open, baffled type with appropriate retention capacity and skimming devices as required.

The microfiltration unit typically is composed of a series of modules with dedicated membrane elements of 0.2 micron or less porosity, operating in a tangential and continous filter mode, and designed for periodic fluid (gaseous and liquid) backwashing to maintain proper flux flow rates. The modular design allows for measurable control of the hydrodynamics of the entire system.

The media of the individual elements within said microfilter may be comprised of ceramic, nylon, polyvinyldifloride (PVDF) or other polymers that are compatible with the process fluids, resistant to free chlorine, and exhibit proper oleo and hydrophobic properties to effectively filter out and release the emulsified oils and entrained micro-organisms. The media may be in the form of self-supported fibers (hollow capillary membranes), larger bored supported tubes, or flat sheets for parallel leaf, plate and frame, or spiral wound elements providing that the fabrication of any said element provides sufficient open area between the surfaces of layered or bundled membranes to allow for appropriate flow passages and release areas for accumulated deposits on the membrane surfaces.

Typically a microfilter with a membrane that is oleophobic but hydrophilic is preferred. However, a membrane that is oleophilic and hydrophobic can be used but an extra high pressure aqueous rewetting step after gaseous backwashing and prior to reestablishing flow will be required after each gaseous backwash to overcome the inherent hydrophobic characteristics of such 0.2 micron or less rated membranes.

Although the present process and apparatus may be utilized advantageously in reconditioning various waste waters and particularly those in the nature of poultry and food processing, it has been found that the present process is especially useful for reconditioning overflow waste chilling water for direct reuse in conventional submerged poultry liquid chill tanks.

It is to be understood that the invention covers a process that involves the use of a series of known and established pieces of equipment, but, that the invention specifically relates to the manner in which each piece of equipment relates to the process to allow for a continuous self-cleaning, effective, reliable, and economical system for reuse and recycle of waste water in the poultry and food processing industry.

It is therefore the most important object of this invention is to provide a process for inexpensively reconditioning waste water in poultry and food systems and particularly the overflow from poultry chill water tanks, for direct reuse in lieu of a continuous once through fresh water system by passing the waste water through a series of uniquely dedicated apparatus forming a part of the invention in an automatic and continuous cyclic process whereby treatment chemicals and filtration aiding additives are not used and that the present process conforms to current United States Department of Agriculture regulations for acceptable water quality for reuse.

A further important object of this invention is to provide an improved process and unique selection of apparatus for reconditioning overflow water chill water for direct reuse wherein the critical filter apparatus is in the form of a self-cleaning automatic microfilter capable of operating in a tangential and continuous filter mode with periodic fluid and gaseous backwash intervals to enable the release and removal of collected and unwanted particulates without the use of customary disposable filtration elements and additive chemicals and filtration aids.

Also an important object of this invention is to provide simplified apparatus in conjunction with the above microfilter unit for removing large lumps of fat and grease prior to the microfilter wherein the apparatus is in the form of a finite screen and static flotation tank unit and contribute both towards sustained operation of the microfilter and a discrete reduction in sewage surcharges.

It is yet another object of the present invention to provide an automated system for reconditioning overflow waste chill water for reuse that senses turbidity, water flow rates, and water demands at preselected positions in the process and a means to integrate said data through a process control center which establishes and records quality and demand water reuse.

Still another object of the present invention is to provide the process that comprises said referenced equipment which are readily manufactured to food grade standard uses and are easily cleaned and sanitized at routine intervals per USDA regulations.

These and other objects, advantages, and features shall hereinafter appear, and for the purposes of illustration, but not for limitation, an exemplary embodiment of the present invention is illustrated in the accompanying drawing(s) and description of prefered embodiments.

BRIEF DESCRIPTION OF THE DRAWINGS (S)

FIG. 1 is a block schematic diagram of the water reconditioning and reuse process showing the basic equipment, liquid flow paths, and the location of the sensors for a central control system in accordance with the present invention.

All liquid streams are graphically illustrated by solid straight lines with arrows indicating direction of flow whereas basic interconnecting instrument and sensor signal connections that form a part of this invention are illustrated by dashed straight lines.

DETAILED DESCRIPTION OF THE PREFERRED EMBODIMENT

Figure 1:
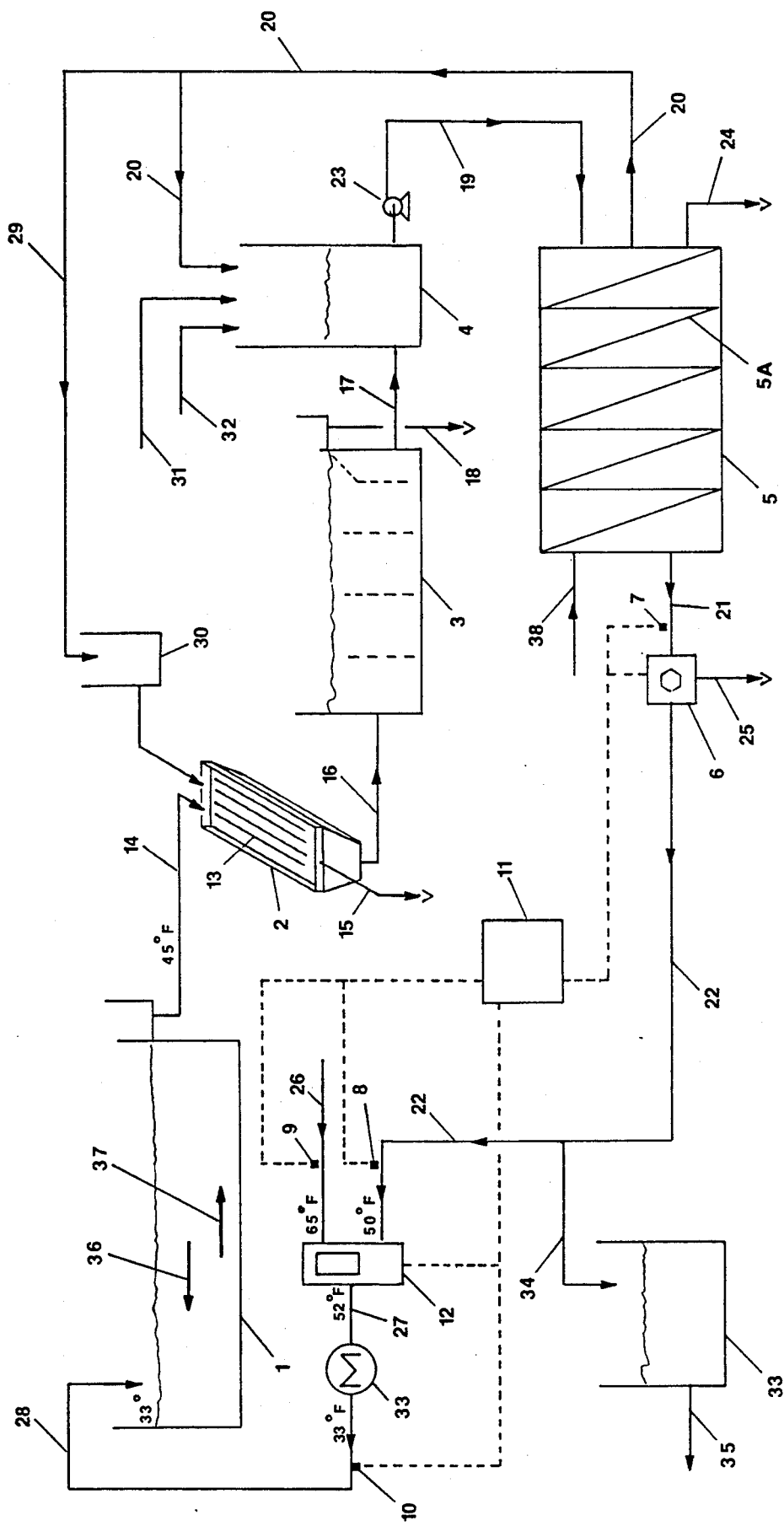

With reference to FIG. 1, a system for reprocessing overflow waste water 14 as discharged from carcass chill tank 1 in accordance with the present invention comprises a slopping primary screen separator 2, a static flotation tank 3, a microfilter 5, a turbidity control valve 6 and a quality return stream 22. The control and quality of which is monitored by a process controller 11 further detailed in this section. Carcass movement is indicated by arrow 36 and chilling water flow by arrow 37.

Primary screen separator 2 directs entrained oversized lumps of fat and grease over its surface 13 to a disposal line 15 whereas the remaining debris laden water passes through the screen 13 into static flotation tank 3 through line 16. Screen 13 is normally a nominal 100 mesh screen and the passage of lumps over its surface may augmented by a forward thrusting vibrator.

In tank 3, additional floatable suspended solids of fats, oils and grease rise to the surface and are removed through overflow line 18 whereas the remaining haze laden water 17 which includes emulsified oils, lipids, proteins and micro-organisms pass into break tank 4.

The initial removal of large lumps and floatable solids from microfilter feed stream 14 is a critical requirement of this invention to ensure sustained operation of microfilter 5.

Break tank 4 is fundamentally an interim holding tank to contain the feed for pump 23. Pump 23 provides the high volume crossflow and filtering pressure to permit separation of the emulsified globules from the liquid stream 19 across the membranes 5A of microfilter 5 producing a tangential cleaning stream 20 and a permeate stream 21. Periodic liquid and gaseous back pulsing 23 permits removal of gross contaminants that have adhered to the surface of the membranes 5A via discharge line 24, all of which is readily and automatically controlled by internal differential and flow sensors within the flow train of microfilter 5 through a dedicated microprocessor, which in turn is capable of controlling automatic, semi-automatic or manual backwashing and cleaning of the membranes 5A in situ. Some additional backwashing and flushing is possible by directing some of the recirculating liquid 20 through line 29 into the intermitant surge tank 30.

Permeate stream 21 now is free of contaminants and passes across a turbidity sensing probe 7 to determine the level of purification and effectiveness of the microfilter 5. Turbidity and light transmission units are directly correlated to indicate clarity and acceptable micro-organism removal. Stream 21 hereafter passes through a two-way selector valve 6 and, if sensor 7 indicates acceptable limits, stream 21 is routed to a ratio flow controller 12, via line 22. Conversely, if stream 21 fails to meet acceptable limits, it is rejected by selector valve 6 via line 25 to discharge sewer or back to break tank 4 for reprocessing. In addition, if an excess of reconditioned water is produced, some on part of stream 22 can be routed to an intermittent water storage tank 33 via line 34 for subsequent reuse 35 for scalding, washing, waste fluming, prechilling and general cleanup At this point in the process some fresh water 26 is also introduced through the ratio flow controller 12 as fresh make-up water to provide water to replace drag-out losses as the chilled carcasses are constantly being removed, and other splash and incidental overflow losses.

Flow rates for streams 23 and 26 are monitored by flow sensors 8 and 9 and a totalizing flow sensor 10 which in turn is regulated through process ratio controller 11 to provide required amounts of combined chilled water 28 for proper operation of chill tank 1 as dedicated by production rates, water temperatures, and water quality. The fresh water 26 normally is supplied at an average temperature of 65 degrees F. and must be cooled down to 33 degrees F. through chiller 13 whereas the reconditioned water 23 which in this invention is now the major volume of the cooling liquid and is being returned at approximately 50 degrees F., has to be cooled only down to 33 degrees F. through chiller 13, resulting in a refrigeration saving of 15 degrees F. differential cooling load.

Daily routine cleaning and sanitizing at the end of each operating cycle is accomplished by isolating break tank 4 and microfilter 5 and introducing standard cleaning chemicals through line 31 and fresh water 32 into break tank 4 and microfilter 5 by using pump 23 and circuits 19, 20, 21, 24, 25, and 29. Final wash, drain and rinse of the entire system fall within standard accepted wash and sanitizing process procedures as dictated by the Poultry and Food Processing Requirements.

I claim:

1. A process for effectively, reliably and continuously reconditioning overflow waste water from carcass chilled tanks as used in poultry processing industries for direct reuse without the addition of chemicals and filter-aid compounds and by processing said overflow waste water through a series of progressively dedicated apparatus comprising:

a screening means for removal of gross lumps of fat and carcass debris that contribute to excessive equipment pluggages;

a static flotation means for removal of emulsified lighter-than-water materials including fats, oils, grease and encapsulated micro-organisms;

a high speed pumping means to provide pressure for microfiltration and to reduce the size of remaining suspended particles;

a final microfiltration means for removal of deleterious emulsified haze producing compounds and encapsulated micro-organisms, and, that said microfiltration means does utilize microporous membrane elements with discrete oleophobic and hydrophilic characteristics in a 0.2 micron or smaller porosity range, operates in a tangential and continuous filter mode, is designed for periodic fluid backwashing to maintain steady flux flow rates, and does remove said deleterious contaminants.

2. A process for reconditioning said waste overflow chill water for direct reuse as claimed in claim 1 wherein the integrity of the reconditioned water is continuously monitored by a turbidity sensor, the turbidity indication of which is directly correlated to correspond to associated levels of solids and micro-organisms, and thereby provides capability for instant monitoring of the performance of the microfilter and the overall production of quality reconditioned water through a central control unit.

3. A process for reconditioning and recycling said waste overflow chill water as claimed in claim 1 to provide a substantial saving in refrigeration costs wherein the said recycled reconditioned water remains at a lower return temperature than the initial temperature of incoming fresh water prior to re-refrigeration.

4. A process as claimed in claim 1 for reconditioning said waste overflow chill water for intermittent storage and subsequent reuse including scalding, washing, waste fluming, prechilling, and clean-up; and does provide an enviromentally acceptable method to reduce fresh water consumption and sewage treatment.

5. A process for reconditioning said waste overflow chill water as claimed in claim 1 wherein the reconditioned water does conform to United States Department of Agriculture Code of Federal Regulations For Pountry Products and Chiller Water Reuse that mandate levels of optical clarity, microorganism removal and compatibility with cleaning and sanitizing techniques for direct reuse of waste chill water in the poultry industry.

* * * * *

UNITED STATES PATENT AND TRADEMARK OFFICE
CERTIFICATE OF CORRECTION

PATENT NO. : 5,173,190
DATED : Dec. 22, 1992
INVENTOR(S) : Charles R. Picek

It is certified that error appears in the above-indentified patent and that said Letters Patent is hereby corrected as shown below:

Column 5 Line 37 should read:
   38 permits removal of gross contaminents that have Column 6 Line 1 should read:
   Flow rates for streams 22 and 26 are monitored by flow Column 6 Line 9 should read:
   down to 33 degrees F. through chiller 33 whereas the Column 6 Line 10 should read:
   reconditioned water 22 which in this invention is now Column 6 Line 13 should read:
   cooled only down to 33 degrees F. through chiller 33, Signed and Sealed this Fourth Day of January, 1994

Attest:

BRUCE LEHMAN

Attesting Officer     Commissioner of Patents and Trademarks